A. SPRINGSTEEN.
Corn-Planters.
No. 144,711. Patented Nov. 18, 1873.
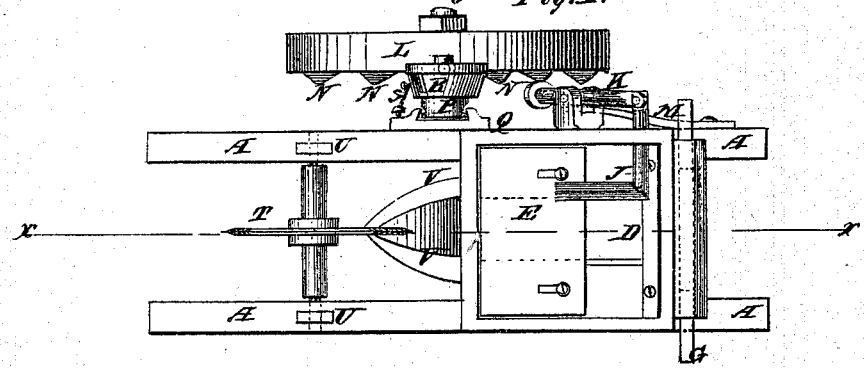
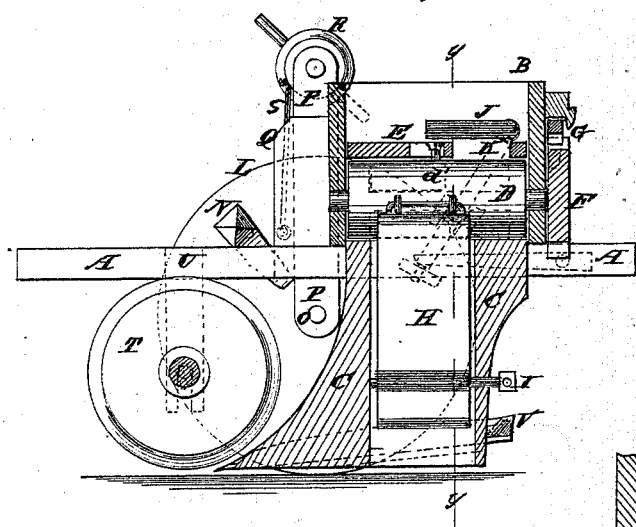
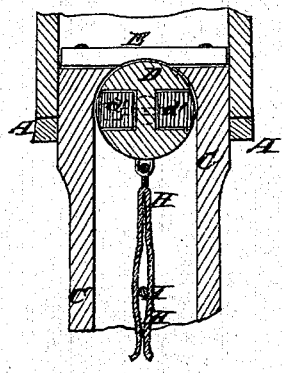
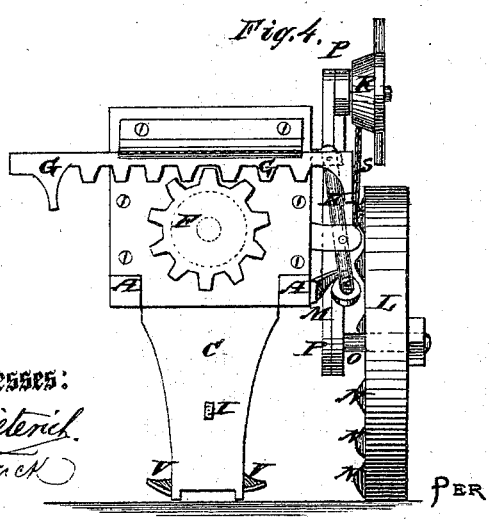
Witnesses:
P. C. Dieterich
Sedgwick
Inventor:
A. Springsteen
per
Attorneys.

UNITED STATES PATENT OFFICE.

ANDREW SPRINGSTEEN, OF OQUAWKA, ILLINOIS.

IMPROVEMENT IN CORN-PLANTERS.

Specification forming part of Letters Patent No. 144,711, dated November 18, 1873; application filed February 21, 1873.

*To all whom it may concern:*

Be it known that I, ANDREW SPRINGSTEEN, of Oquawka, in the county of Henderson and State of Illinois, have invented a new and useful Improvement in Corn-Planter, of which the following is a specification:

Figure 1 is a top view of my improved corn-planter. Fig. 2 is a detail vertical longitudinal section of the same, taken through the line $x\ x$, Fig. 1. Fig. 3 is a detail vertical cross-section of the same, taken through the line $y\ y$, Fig. 2. Fig. 4 is a rear view of the same.

Similar letters of reference indicate corresponding parts.

The invention consists in the improvement of corn-planters, as hereinafter fully described, and pointed out in the claims.

A represents the frame-work of the machine, to the rear part of which the hopper B is securely attached. C is the standard of the opening-plow, which is securely attached to the frame A, and is made hollow to serve as a spout to conduct the seed into the furrow opened by the plow formed upon or attached to the lower end of the said standard C. In the upper end of the hollow standard C is fitted the dropping-roller D, the upper side of which projects a little above the upper end of the standard. In the opposite sides of the roller D are formed two openings or recesses to receive the seeds from the hopper B, and discharge it into the interior of the standard C. The size of the holes in the sides of the roller D are regulated, so that the said holes may contain exactly the desired number of kernels, by blocks $d'$ inserted in said holes, and secured in place, adjustably, by a screw. The size of the discharge-opening in the bottom of the hopper B is adjusted by a plate, E, secured adjustably in place by set-screws passing through slots in said plate, as shown in Figs. 1 and 2. The rack and pinion F G may be operated in any suitable manner to vibrate the roller D. To the lower side of the dropping-cylinder D is pivoted the upper end of a plate, H, which passes down through the interior of the standard C, and is slotted longitudinally to receive the pin I, by which it is connected to said standard. By this arrangement the plate H not only serves as a guide for the corn, but at the same time the alternating movement of the roller D gives to the said plate H an up-and-down movement, so that it may push out any dirt that may enter the interior of the standard C. J is a stirrer, the stem or shank of which passes through a hole in the side of the hopper B, so that the stirrer may move back and forth in the hopper B above the discharge-opening, and thus keep the corn stirred up, so that it cannot clog and will pass out freely. The stirrer moves back and forth close to the upper side of the dropping-roller D, so as to operate as a cut-off to prevent any more seed than enough to fill the dropping-recesses from being carried out by said roller. The outer end of the shank of the stirrer J is pivoted to the upper end of a lever, K, which is pivoted to a stud attached to the lower part of the side of the hopper B. The lower end of the lever K has a friction roller or wheel placed upon it, and projects downward into such a position as to rest against the inner side of the wheel L, against which it is held by the spring M, which is attached to the frame A, and the free end of which presses against the said lever K. Upon the inner side of the wheel L are formed radial projections N, by which the lever K is operated to operate the stirrer J. The wheel L revolves upon a journal, O, attached to or formed upon a bar, P, which slides up and down in a way, Q, attached to the side of the hopper B. To the upper end of the slide P is pivoted a pulley or drum, R, which is provided with a lever-crank, or other convenient means, for operating it, and should be provided with a ratchet-wheel and pawl for holding it securely in any position into which it may be adjusted. To the pulley or drum R is attached one end of a cord or chain, S, the other end of which is secured to the lower part of the way Q, so that, by turning the pulley R in one direction, the slide P, and with it the wheel L, may be forced downward, raising the other parts of the machine to adjust the opening-plow to work at any desired depth in the ground, or to raise said plow away from the ground. T is a rotary cutter, placed just in front of the opening-plow, and the journals of which work in arms U, attached to the frame A. V are the covering plows or wings, which are attached to the sides of the lower end of the standard C, and which are so formed, as shown in Figs. 1, 2, and 4, as to guide the soil into the furrow at the rear of said standard C, and cover the seed.

Having thus described my invention, I claim as new and desire to secure by Letters Patent—

1. The slide J, reciprocating over the upper side of feed-roll D, thus serving both as a stirrer and a cut-off, in the manner set forth.

2. The wings V V, inclined upwardly in front, one placed on each side and at the lower end of piece C, as and for the purpose specified.

ANDREW SPRINGSTEEN.

Witnesses:
HIRAM ROSE, Jr.,
ALEXANDER CASTEEL.